Jan. 1, 1946.     W. S. BELLOWS     2,391,861
LOCKING HINGE
Filed Jan. 31, 1944

INVENTOR
Warren S. Bellows
BY O.Z.McCoy
ATTORNEY

Patented Jan. 1, 1946

2,391,861

UNITED STATES PATENT OFFICE 2,391,861

LOCKING HINGE

Warren S. Bellows, Cleveland, Ohio, assignor of one-fourth to Elmer H. Fox and one-fourth to Orlando Z. McCoy, both of Cleveland, Ohio Application January 31, 1944, Serial No. 520,380

10 Claims. (Cl. 16—142)

This invention relates to releasable locking hinge assemblies and more particularly to a spring pressed hinge assembly for releasably maintaining hingedly joined members in an extended relation with respect to each other.

The objects of the present invention include the provision of an improved, compact and dependable spring pressed hinge assembly for disposition at a junction between hingedly joined members for releasably maintaining the joined members in extended relation with respect to each other with increasing firmness under agitation, buffeting or vibration; a hinged joint releasable securing means that imparts firmness to the joint in its extended state; a hinged joint lock that is positive and dependable in its functions; that is simply made and installed at a minimum of cost and expense; and that is simply and safely released so that the hingedly joined members rest flat against each other for storage with a minimum of occupied space.

With the above and other objects in view which will be apparent to those who are familiar with the problems encountered in the trade of making, using and selling articles of furniture and the like, that are provided with folding portions, such as legs, shelves, and the like, illustrative embodiments of the present invention are shown in the accompanying drawing wherein.

Figure 1:
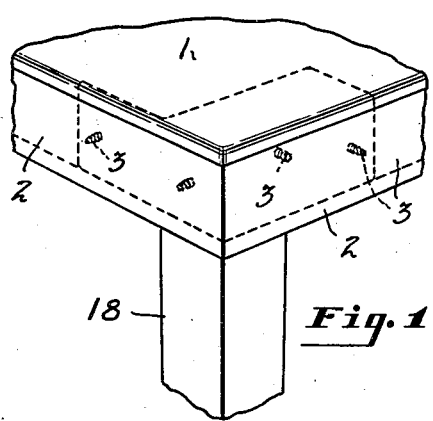
Fig. 1 is a fragmentary corner of a folding leg table on the inner side of which a releasable locking hinge that embodies the present invention is installed as indicated in dotted outline.
Figure 2:
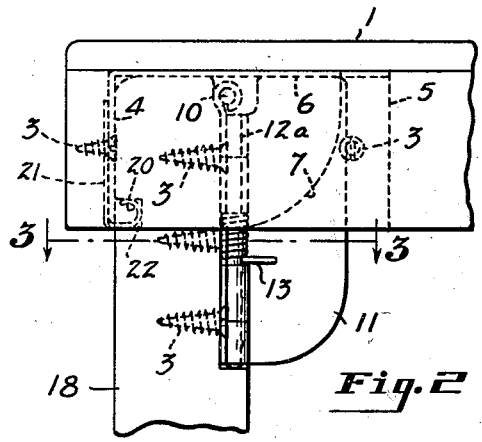
Fig. 2 is an enlarged fragmentary side elevational view of the table corner and leg that are shown in Fig. 1 with partial detail of the releasable locking hinge that joins the leg to the table top and releasably secures it in its extended position.
Figure 5:
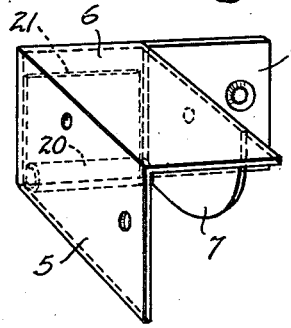
Fig. 5 is a perspective view of the housing frame part of the device that is shown in Fig. 2.
Figure 4:
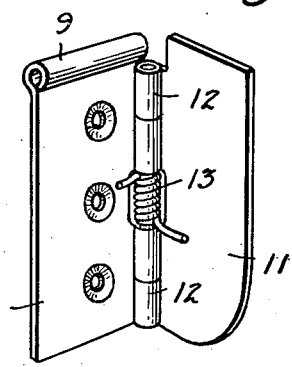
Fig. 4 is a perspective view of the releasable spring pressed locking hinge part of the device that is shown in Fig. 2.
Figure 3:
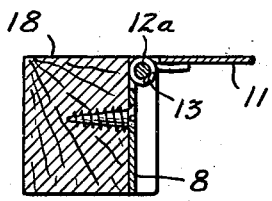
Fig. 3 is a sectional view taken along the line 3—3 of Fig. 2.

An illustrative installation of the device that forms the subject matter of the present invention comprises a table top 1 that terminates laterally in depending edges 2. Where the table top 1 and edges 2 are formed of plastic material, supporting and attaching corner plates of the device may be embedded in the plastic or secured thereto by suitable means, such as screws 3 or the like, that serve in a like capacity when the table top 1 and edges 2 are of other material, such as wood, metal or other suitable composition. The securing screws 3 are disposed in desirably positioned holes in a back plate 4 and a side plate 5 that comprise attaching and supporting plates of the device. A top plate 6 and a skirt plate 7 complete the supporting plates of the device. The plates 4, 5, 6 and 7 are preferably integrally continuous with each other as shown in Fig. 5 of the accompanying drawing, by being drawn, or shaped and welded together where needed, as preferred, to provide the device with a firm and rugged mounting for a movable and extendable member that is to be hingedly mounted thereamong.

A member of the device that is adapted for pivoting and for releasably securing the movable member of the assemblage in its extended position, comprises a hinge plate 8 that terminates upwardly in a sleeve 9 in which a pin 10 is journaled so that the hinge plate may rotate therearound. The ends of the pin 10 are secured in suitably positioned apertures in the spaced plates 5 and 7 so that the pin 10 extends substantially parallel to the plates 4 and 6. The movable member is maintained in extended relation by a supporting plate 11 of a desired configuration. The supporting plate 11 is hinged at 12 to the hinge plate 8 on a pin 12a and preferably is yieldingly and resiliently maintained rotatably away from the hinged plate 8 by suitable means such as a spiral spring 13, or the like. The upper edge of the supporting plate 11 makes bindingly sweeping abutting engagement with the under side of the top plate 6 to maintain the extended member of the assemblage in its extended relation with respect to the under side of the table top 1.

Figure 8:
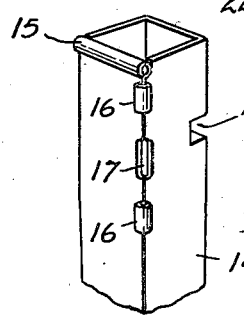
Fig. 8 is a fragmentary elevation of the upper end of a hollow metal or plastic leg adapted for hinged installation in the frame that is shown in Fig. 5.

The extended member is preferably of hollow construction in the interests of maintaining a minimum weight for the assemblage, such as a hollow leg 14 that is shown in Fig. 8, or the like. Where the leg 14 is made of metal or of a plastic of sufficient strength, the pin 10 is journaled in a sleeve 15 part thereof and the supporting plate 11 is hinged to the leg 14 in a suitable manner, as in sleeves 16 parts thereof, or the like. The spring 13 is disposed in a spring accommodating depression 17 in a corner of the leg 14. This construction omits the hinge plate 8 since the supporting plate 11 is hinged directly to the leg 14.

The extended member may, if preferred, be of solid construction, as where it is made of solid plastic, wood or the like, as a leg 18. In this construction the hinge plate 8 is apertured suitably so that suitable securing means, such as screws 3, or the like, may extend thru the hinged plate 8 and be seated in the leg 18 for firmly securing the hinge plate to the leg 18. If preferred, any other form of anchoring member may extend from the hinge plate 8 into and be cast within the solid leg 18 for permanence, durability and strength within the scope of this invention. It is preferred that the permanence and strength of this junction be assured.

Figure 7:
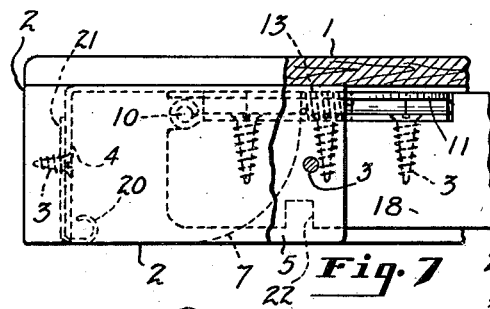
Fig. 7 is a fragmentary elevational view, with parts broken away to show adjacent structure with parts in section and parts in elevation.
Figure 6:
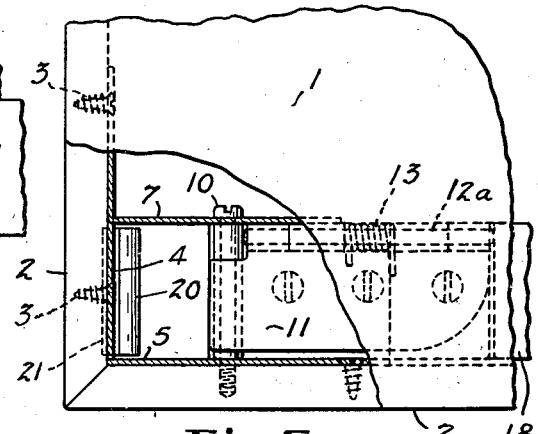
Fig. 6 is a fragmentary plan view of the table, partly broken away to show the underlying structure with parts in section and with the leg collapsed against the bottom of the table.

In operation, the table is normally stored with its legs folded up against the under side of the table top 1 and extending longitudinally of and adjacent to the inner surface of the table edges 2, as shown in Figs. 6 and 7 of the drawing. In this position the supporting plate 11 is interposed between and rests substantially flat against the hinge plate 8 and the top plate 6. The legs in their folded state may be disposed continuously around the under side of the table top 1 inwardly of each of the table edges 2, or they may be cut away longitudinally so that they rest in a common plane beside each other in pairs inwardly of opposite edges 2 of the table, as preferred.

When the table is to be used, the table is caused to rest upon one of its edges 2 and its legs are caused to rotate about the pins 10 until they are in their extended relation with respect to the under side of the table top 1. As the table legs approach their extended positions, the spring 13, acting upon the supporting plate 11, cause the upper edge of the supporting plate 11 to sweep partly across the under face of the top plate 6 until the upper end of the legs rests against the under face of the top plate 6. This provides a direct supporting contact between the upper ends of the table legs and the top plate 6 to resist directly any weight applied to the top of the table. When the legs are fully extended the faces of the legs that are remote from the hinge plates 8 rest flush against the inner faces of the partially enclosed parts of the back plates 4 to resist any straddling of the legs away from each other in one direction. The side plate 5 and the skirt plate 7 preferably fit snugly against opposite sides of the legs and also resist straddling action of the legs away from each other from forces that are applied laterally of the table 1.

When the legs are extended below the table top with their lower ends in engagement with the floor and the table is subjected to repeated lateral movements, the spring 13 continuously urges the supporting plate 11 farther away from the hinge plate 8 until the face of the leg that is remote from the hinge plate 8 has reached its closest contact with the back plate 4, after which the legs remain rigid with respect to the table to which they are attached. The engagement between the upper edge of the supporting plate 11 with the under face of the top plate 6 is preferably sufficiently tight so that the supporting plate 11 approaches but does not contact the skirt plate 7. The table and leg assembly may equally well be replaced by a shelf, table leaf, or the like, having a hinged edge remote from a leg bearing edge, or for other installation where the assemblage performs its intended function.

When it is intended that the legs be again folded against the underside of the table and the table again stored, the supporting plate 11 is depressed or folded flat against the hinge plate 8 and the leg is caused to revolve around the pin 10 until it rests flat against the under side of the table.

The foregoing constructions contemplate close fits between the upper ends of the legs and the stabilizing plate assembly comprising the plates 4, 5, 6 and 7. Where it is desired that more play is to be permitted among these parts so that they operate more easily, it may be desirable to further stabilize the legs in their engagement with the top of the table by a stiffening spring means. For this purpose a roll 20 is also disclosed as being on the end of a spring plate 21 or it may be an extension from the lower edge of the partly enclosed part of the back plate 4, as preferred. The spring plate 21 is anchored between the partly enclosed part of the back plate 4 and the inner face of the edge 2 of the table by the use of screws 3 or the like. The roll 20 is adapted for snugly seating in a groove 22 in the legs that are hingedly joined to the table. When the leg is brought from its folded position into its extended position, the roll 20 first engages an edge of the groove 22 and then yieldingly seats within the groove 22 into which it preferably seats with a minimum of spare space so that the spring plate 21 stiffly maintains the extended leg in firm relation with the table top. When the leg is folded from its extended to its closed position the groove 22 is withdrawn from housing the roll 20.

It is to be understood that the constructions and the parts of the devices that have been described herein and illustrated in the accompanying drawing have been submitted for the purposes of presenting a concrete embodiment of the present invention and that various modifications for adaptations to a particular use or installation may be made without departing from the present invention as defined by the appended claims.

What I claim is:

1. Apparatus of the class described comprising a member arranged to provide a pocket, a second member movable between a collapsed and an extended position and having an end arranged in and being pivotally mounted in said pocket, said movable member being provided with a groove, and a roll formed of spring material supported by the pocket forming member and extending into said pocket, said roll being spaced from the movable member when it is in its collapsed position and being receivable within the groove of the movable member when it is in its extended position to maintain it in such extended position.

2. Apparatus of the class described comprising sheet material arranged to form a rectangularly-shaped pocket, a member movable from a collapsed to an extended position having an end arranged in and pivotally mounted adjacent the upper edge of said pocket and being provided with a groove, a roll of spring material supported by the sheet material and extending into said pocket and being spaced from said movable member when it is in its collapsed position, said roll being receivable within and yieldingly filling said groove when the movable member is in its extended position to maintain the movable member in its extended position and being releasable from said groove when said member is moved to its collapsed position.

3. Apparatus of the class described comprising a member arranged to provide a pocket, said member including an upper plate and a back plate, a member movable from a collapsed to an extended position having one end pivotally mounted adjacent the upper plate within said pocket and being provided with a groove spaced from its upper end, a plate hingedly mounted on said movable member which is collapsible thereagainst when the movable member is in its collapsed position, a roll formed of spring material supported by the back plate and extending into said pocket, and said roll being receivable within said groove to maintain the movable member in its extended position and said hingedly mounted plate being extendable to form a support for the upper plate when the movable member is moved to its extended position.

4. Apparatus of the class described comprising a frame including side and skirt plates and a top plate, a first member having one end pivotally mounted in said frame between the side and skirt plates in proximity to but below said top plate and its other end being movable from a collapsed position in proximity to said top plate to an extended position, and a second member hingedly mounted to the first member which is foldable thereagainst when the first member is in its collapsed position, and means for forcing a portion of the second member into engagement with said top plate when the first member is moved to its extended position to aid in supporting the top plate and for maintaining the first member in its extended position.

5. Apparatus of the class described comprising a frame including a top plate, a rectangularly-shaped member having one end pivotally mounted on said frame in proximity to said top plate and its other end being movable from a collapsed position in proximity to said plate to an extended position, and a second rectangularly-shaped member pivotally mounted on the first member along one of its longitudinal edges and being collapsible upon the first member when the first member is in its collapsed position and resilient means for forcing one end of the second member into engagement with said plate when the first member is moved to its extended position.

6. A hinge assembly for table tops having legs which are movable from a collapsed position in proximity to the top of the table to an extended position in which they support the table top comprising a hinge plate pivotally mounted adjacent the top of the table and having a face secured to one of said legs and a second hinge plate pivotally mounted to and being collapsible against the first hinge plate when the leg is in its collapsed position, and resilient means arranged between the two hinge plates for forcing the second hinge plate to a position in which its upper edge aids in supporting the table top when the leg is moved to its extended position.

7. A hinge assembly for table tops having legs which are movable from a collapsed position in proximity to the top of the table to an extended position in which they support the table top comprising a frame arranged at each corner beneath the table top and including a side plate, a skirt plate and a top plate, a hinge plate having its upper end pivotally mounted between the side plate and the skirt plate and one of its faces secured to one of said legs, and a second hinge plate pivoted to the first hinge plate and being foldable thereagainst to cause one of its faces to bear against the top plate of said frame when the leg is in collapsed position, and resilient means arranged between the hinge plates for forcing the second hinge plate to a position in which its upper edge bears against the top plate and aids in supporting said table when the leg is in its extended position.

8. A hinge assembly for table tops having legs which are movable from a collapsed position in proximity to the table top to an extended position in which they support the table top comprising a frame arranged at each corner beneath the table top and including a side plate, a skirt plate, a top plate and a back plate, a roll formed of spring material supported by the back plate, a hinge plate having its upper end pivotally mounted between the side plate and the skirt plate and one of its faces secured to one of said legs, and a second hinge plate having one of its longitudinal edges pivoted to the first hinge plate and being foldable thereagainst to cause one of its faces to bear against the top plate when the leg is in its collapsed position, resilient means arranged between the hinge plates for forcing the second hinge plate away from the first hinge plate to a position in which its upper edge bears against the top plate and aids in supporting said table when the leg is in its extended position and said roll being releasably receivable in a groove formed in said leg when the leg is in its extended position.

9. A hinge assembly for table tops having a leg which is movable from a collapsed position in proximity to the table top to an extended position in which it supports the table top comprising a frame including a side plate, a skirt plate, and a back plate, said side and skirt plates having aligned apertures therein to receive a pintle to provide a pivot for said leg and said back plate being adapted to serve as an abutment for said leg when the leg is moved from its collapsed to its extended position, and a roll of spring material supported by said back plate which is arranged between the side and skirt plates and which is yieldingly receivable within a groove formed in said leg when the leg is in abutting engagement with the back plate.

10. A hinge assembly for table tops having a leg which is movable from a collapsed position in proximity to the table top to an extended position in which it supports the table top comprising a frame including a side plate, a skirt plate and a back plate, said side and skirt plates having aligned apertures therein to receive a pintle and being spaced at such distance from each other that said leg is guided between the side and skirt plates in its movement from its collapsed to its extended position and said back plate being adapted to form an abutment for said leg when the leg is moved to its extended position, and a roll of spring material supported by said back plate which is yieldingly receivable within a groove formed in said leg when the leg is in abutting engagement with the back plate.

WARREN S. BELLOWS.